United States Patent
Yan et al.

(10) Patent No.: US 11,859,876 B2
(45) Date of Patent: Jan. 2, 2024

(54) MULTI-CONNECTED HEAT RECOVERY AIR CONDITIONING SYSTEM AND CONTROL METHOD THEREOF

(71) Applicant: Guangdong Giwee Technology Co. Ltd., Foshan (CN)

(72) Inventors: Xiaolou Yan, Foshan (CN); Huandi Yang, Foshan (CN)

(73) Assignee: GUANGDONG GIWEE TECHNOLOGY CO. LTD., Foshan (CN)

( * ) Notice: Subject to any disclaimer, the term of this patent is extended or adjusted under 35 U.S.C. 154(b) by 91 days.

(21) Appl. No.: 17/358,117

(22) Filed: Jun. 25, 2021

(65) Prior Publication Data

US 2021/0404714 A1  Dec. 30, 2021

(30) Foreign Application Priority Data

Jun. 29, 2020  (CN) .......................... 202010603360.6

(51) Int. Cl.
  *F25B 13/00* (2006.01)
  *F25B 41/325* (2021.01)
  *F24H 4/04* (2006.01)

(52) U.S. Cl.
  CPC ............ *F25B 13/00* (2013.01); *F25B 41/325* (2021.01); *F24H 4/04* (2013.01); *F25B 2313/004* (2013.01);

(Continued)

(58) Field of Classification Search
  CPC .. F25B 13/00; F25B 41/325; F25B 2313/003; F25B 2313/004; F25B 2313/005;
  (Continued)

(56) References Cited

FOREIGN PATENT DOCUMENTS

CN    2460899 Y    11/2001
CN    102865691 A   1/2013
(Continued)

OTHER PUBLICATIONS

European Search Report for Application No. 21181221.9; dated Nov. 9, 2021; 9 Pages.
(Continued)

*Primary Examiner* — Kun Kai Ma
(74) *Attorney, Agent, or Firm* — CANTOR COLBURN LLP

(57) ABSTRACT

A multi-connected heat recovery air conditioning system and a control method thereof. The multi-connected heat recovery air conditioning system includes an indoor unit, an outdoor unit and a hydraulic module, wherein the outdoor unit comprises a compressor, an outdoor heat exchanger, a first four-way valve and a second four-way valve. The multi-connected heat recovery air conditioning system further comprises an indoor unit temperature unit, a water temperature unit, a high-pressure sensor and a low-pressure sensor. The indoor unit temperature unit is arranged in the indoor unit for detecting and obtaining the outlet temperature value of the indoor unit, the water temperature unit is arranged at a heat exchange water tank for detecting and obtaining water temperature, and the high-pressure sensor and the low-pressure sensor are arranged at the output end and the air return end of the compressor respectively.

8 Claims, 1 Drawing Sheet

(52) U.S. Cl.
CPC . *F25B 2313/006* (2013.01); *F25B 2313/0233* (2013.01); *F25B 2313/02742* (2013.01); *F25B 2313/0313* (2013.01); *F25B 2313/0315* (2013.01); *F25B 2500/18* (2013.01); *F25B 2600/11* (2013.01)

(58) Field of Classification Search
CPC ........ F25B 2313/006; F25B 2313/0233; F25B 2313/02742; F25B 2313/0315; F25B 2500/18; F25B 2600/11; F25B 2313/0231; F25B 2313/0314; F25B 2700/1931; F25B 2700/1933; F24H 4/04; F24H 4/02; F24F 5/001; F24F 1/0003; F24F 5/0096; F24F 11/30; F24F 11/64; F24F 11/65; F24F 11/77; F24F 11/84; F24F 12/00; F24F 2140/12; F24F 2140/20
See application file for complete search history.

(56) References Cited

FOREIGN PATENT DOCUMENTS

| | | | |
|---|---|---|---|
| CN | 102914013 A | | 2/2013 |
| CN | 108895584 A | * | 11/2018 |
| CN | 108895584 A | | 11/2018 |
| CN | 111336585 A | * | 6/2020 |
| CN | 111336585 A | | 6/2020 |
| WO | WO-2019064332 A1 | * | 4/2019 .............. F25B 13/00 |

OTHER PUBLICATIONS

Chinese Office Action for Application No. 202010603360.6; dated Apr. 2, 2021; 10 Pages.

* cited by examiner

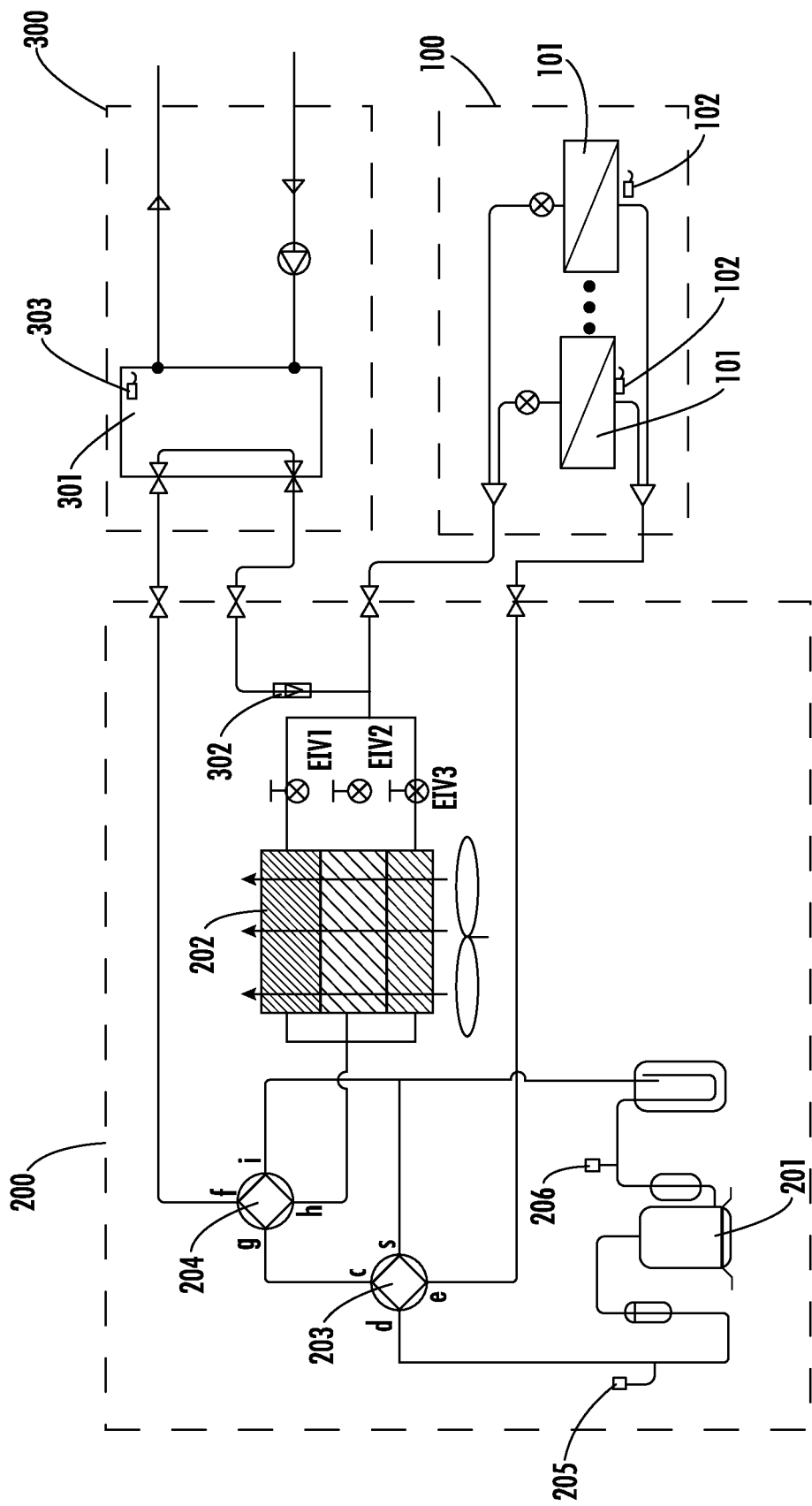

MULTI-CONNECTED HEAT RECOVERY AIR CONDITIONING SYSTEM AND CONTROL METHOD THEREOF

FOREIGN PRIORITY

This application claims priority to Chinese Patent Application No. 202010603360.6, filed Jun. 29, 2020, and all the benefits accruing therefrom under 35 U.S.C. § 119, the contents of which in its entirety are herein incorporated by reference.

TECHNICAL FIELD

The present invention relates to the technical field of detecting heat recovery control in multi-connected systems, in particular to a multi-connected heat recovery air conditioning system and a control method thereof.

BACKGROUND

In multi-connected air conditioning systems, under the circumstances when the outdoor unit (outdoor heat exchanger) is relatively large, if the indoor unit is operated in the cooling mode under a low load, incomplete evaporation is prone to occur in the indoor unit and results in liquid backflow; and if the indoor unit is operated in the heating mode under a low load, the outdoor heat exchanger may experience tripping due to excessive high evaporation pressure; in the heat recovery mode, because the indoor unit and the outdoor unit have different loads as evaporators, it is easy to result in poor cooling effect of the indoor unit; in the hot water production mode, if the outdoor temperature is high, excessive high pressure is likely to occur in the outdoor unit.

The technical reasons for the above problems are as follows: 1) since the outdoor unit of a multi-connected air conditioning system needs to work with different combinations of indoor units, the outdoor unit (outdoor heat exchanger) is large in size, which is likely to cause incomplete evaporation in the indoor unit when the indoor unit is operated in the cooling mode under a low load; 2) in the hot water mode of the multi-connected air conditioning system, in the case of high outdoor temperature, the large amount of heat exchange of the outdoor heat exchanger will result in excessively high pressure of the hot water; 3) in the heat recovery mode, due to the difference between indoor and outdoor environmental conditions, as well as a large refrigerant flow rate due to the large size of the outdoor heat exchanger, the indoor unit has a poor cooling effect.

SUMMARY

The objective of the present invention is to overcome the shortcomings in the prior art and provide a multi-connected heat recovery air conditioning system and a control method thereof, which can flexibly adjust the capacity of the outdoor heat exchanger for different indoor units so that the outdoor unit can operate adaptively on demand and the operation of the air conditioning system is optimized.

In order to achieve the above objective, the present invention provides a multi-connected heat recovery air conditioning system, comprising an indoor unit, an outdoor unit and a hydraulic module, wherein the outdoor unit includes a compressor, an outdoor heat exchanger, a first four-way valve and a second four-way valve, and the hydraulic module includes a heat exchange water tank. The ports d, e, c, and s of the first four-way valve are respectively connected to an output end of the compressor, one end of the indoor unit, port g of the second four-way valve, and an air return end of the compressor. The ports h, i, and f of the second four-way valve are respectively connected to the outdoor heat exchanger, the air return end of the compressor, and one end of the refrigerant flow path of the heat exchange water tank. The other end of the refrigerant flow path of the heat exchange water tank is connected in a bypass manner between a first solenoid valve and the outdoor heat exchanger via a first check valve, and the other end of the outdoor unit is connected to the outdoor heat exchanger. The outdoor heat exchanger comprises three heat exchange coils arranged in parallel in the wind direction of the wind blades thereof, wherein the three heat exchange coils are connected together at one end to connect to port h of the second four-way valve, and the other end of the three heat exchange coils are connected to preset first outdoor expansion valve, second outdoor expansion valve, and third outdoor expansion valve respectively, and then joint together to connect to the outdoor unit. The system further comprises an indoor unit temperature unit arranged in the indoor unit for detecting and obtaining the outlet temperature value of the indoor unit, a water temperature unit arranged at the heat exchange water tank for detecting and obtaining water temperature, and a high-pressure sensor and a low-pressure sensor arranged at the output end and the air return end of the compressor, respectively.

Further, the indoor unit includes at least two indoor heat exchangers arranged in parallel, and each indoor heat exchanger is provided with an indoor unit temperature unit.

A control method of a multi-connected heat recovery air conditioning system is provided. The air conditioning system includes a cooling mode, a heating mode, a hot water heat recovery mode, and a hot water production mode. When the air conditioning system is powered on and runs in any mode, the opening and closing conditions of each outdoor expansion valve are adjusted accordingly based on predetermined conditions for each mode; when the air conditioning system is powered on and runs in the cooling mode, the opening and closing conditions of the outdoor expansion valves are adjusted correspondingly based on a cooling demand ratio $\varphi 1$ between a cooling capacity demand N1 of the indoor unit in operation and an overall cooling capacity Nt1 of the indoor unit, and the opening degree of each open outdoor expansion valve is adjusted based on a discharge pressure Tp of the compressor, wherein the larger the cooling demand ratio $\varphi 1$, the greater the number of outdoor expansion valves opened; when the air-conditioning system is powered on and runs in the heating mode, the opening and closing conditions of the outdoor expansion valves are adjusted correspondingly based on a heating demand ratio $\varphi 2$ between an actual heating capacity demand N2 of the indoor unit in operation and an overall heating capacity Nt2 of the indoor unit, and the opening degree of each open outdoor expansion valve is adjusted according to a discharge pressure Tp of the compressor, wherein the greater the heating demand ratio $\varphi 2$, the greater the number of outdoor expansion valves opened; when the air-conditioning system is powered on and runs in the heat recovery mode, the opening and closing conditions of the outdoor expansion valves are adjusted accordingly based on an initial outlet temperature value T2B of the indoor unit in operation, wherein during the operation in the heat recovery mode, a real-time outlet temperature value T2B' of the indoor unit is continuously monitored and the opening degree of each open outdoor expansion valve is adjusted at intervals of a rated period based on the real-time outlet temperature value T2B'; when the air conditioning system is powered on and runs in the hot water production mode, the opening and closing conditions of the outdoor expansion valves are adjusted accordingly based on a water temperature difference ΔT between an actual water temperature T5 and a preset water temperature Ts of the hydraulic module, and the opening degree of each open outdoor expansion valve is adjusted correspondingly based on the discharge pressure Tp of the compressor.

Further, in the cooling mode, when φ1<30%, the second outdoor expansion valve is opened and the first outdoor expansion valve and the third outdoor expansion valve are closed; when 30%≤φ1≤60%, the first outdoor expansion valve and the second outdoor expansion valve are opened and the third outdoor expansion valve is closed; when φ1>60%, the first outdoor expansion valve, the second outdoor expansion valve and the third outdoor expansion valve are all opened.

Further, in the heating mode, when φ2<30%, the second outdoor expansion valve is opened and the first outdoor expansion valve and the third outdoor expansion valve are closed; when 30%≤φ2≤60%, the first outdoor expansion valve and the second outdoor expansion valve are opened and the third outdoor expansion valve is closed; when φ2>60%, the first outdoor expansion valve, the second outdoor expansion valve and the third outdoor expansion valve are all opened.

Further, if the real-time outlet temperature value T2B'>12° C., the opening degree of one of the outdoor expansion valves is reduced, wherein if the opening degree of said outdoor expansion valve is adjusted to the minimum but the real-time outlet temperature value T2B' is still greater than 12° C., the opening degree of another outdoor expansion valve is reduced and the adjustment action is repeated; if the real-time outlet temperature value T2B'<6° C., the opening degree of one of the outdoor expansion valves is increased, wherein if the opening degree of said outdoor expansion valve is adjusted to the maximum but the real-time outlet temperature value T2B' is still less than 6° C., the opening degree of another outdoor expansion valve is increased and the adjustment action is repeated; if 6° C.≤the real-time outlet temperature value T2B'≤12° C., the opening degree of each outdoor expansion valve is maintained unchanged.

Further, upon power-on to operate in the heat recovery mode, when T2B<6° C., the second outdoor expansion valve is opened and the first outdoor expansion valve and the third outdoor expansion valve are closed; when 6° C.≤T2B≤12° C., the number of outdoor expansion valves that are currently open is maintained unchanged; when T2B>12° C., the first outdoor expansion valve, the second outdoor expansion valve, and the third outdoor expansion valve are all opened.

Further, in the hot water production mode, if the water temperature difference ΔT>20° C., the first outdoor expansion valve, the second outdoor expansion valve, and the third outdoor expansion valve are all opened; if the water temperature difference ΔT<5° C., the first outdoor expansion valve is opened and the second outdoor expansion valve and the third outdoor expansion valve are closed; if 5° C.≤water temperature difference ΔT≤20° C., the first outdoor expansion valve and the second outdoor expansion valve are opened and the third outdoor expansion valve is closed.

Furthermore, during the operation in the cooling mode, the blade speed of the outdoor heat exchanger is adjusted according to the high pressure value Ph. If the high pressure value Ph>2.5 MPa, the blade speed is increased; if 1.9 MPa≤the high pressure value Ph≤2.5 MPa, the blade speed is maintained at the rated speed; if the high pressure value Ph<1.9 MPa, the blade speed is reduced.

Furthermore, during the operation in the heating mode, heat recovery mode, or hot water production mode, the blade speed of the outdoor heat exchanger is adjusted according to the low pressure value P1. If the low pressure value P1>1.0 MPa, the blade speed is reduced; if 0.6 MPa≤the low pressure value P1≤1.0 MPa, the blade speed is maintained at the rated speed; if the low pressure value P1<0.6 MPa, the blade speed is increased.

By adopting the above-mentioned solution, the present invention has the following beneficial effects: when the air-conditioning system is powered on and runs in any mode, the opening and closing conditions of each outdoor expansion valve are adjusted accordingly based on the predetermined conditions in each mode, so that the heat exchange conditions of the outdoor heat exchanger of the outdoor unit can be flexibly adjusted according to different indoor unit conditions, and the air conditioning system can achieve optimal operation under various conditions.

BRIEF DESCRIPTION OF THE DRAWINGS

FIG. 1 is a schematic diagram of a structural composition of an air conditioning system of the present invention.

The reference numbers used therein are explained as follows: 100—indoor unit, 101—indoor heat exchanger, 102—indoor unit temperature unit, 200—outdoor unit, 201—compressor, 202—outdoor heat exchanger, 203—first four-way valve, 204—second four-way valve, 205—high pressure sensor, 206—low pressure sensor, 300—hydraulic module, 301—heat exchange water tank, 302—check valve, 303—water temperature unit, EXV1—first outdoor expansion valve, EXV2—second outdoor expansion valve, EXV3—third outdoor expansion valve.

DETAILED DESCRIPTION

In order to facilitate the understanding of the present invention, the present invention will be described more comprehensively below with reference to the accompanying drawings. Although preferred embodiments of the present invention are shown in the drawings, the present invention can be implemented in many different forms and is not limited to the embodiments described herein. The purpose of providing these embodiments is to make the disclosure of the present invention more thorough and comprehensive.

Referring to FIG. 1, in this embodiment, an air conditioning system includes an indoor unit 100, an outdoor unit 200, and a hydraulic module 300. The outdoor unit 200 includes a compressor 201, an outdoor heat exchanger 202, a first four-way valve 203, a second four-way valve 204, and a plurality of outdoor expansion valves (for ease of understanding, three outdoor expansion valves are shown, namely, the first outdoor expansion valve EXV1, the second outdoor expansion valve EXV2, and the third outdoor expansion valve EXV3). The hydraulic module 300 includes a heat exchange water tank 301, wherein the heat exchange water tank 301 includes a refrigerant flow path and a water flow path. The water flow path is connected to the water side through an outlet pipe and a return pipe respectively.

In this embodiment, ports d, e, c, and s of the first four-way valve 203 are connected to an output end of the compressor 201, the indoor unit 100, port g of the second four-way valve 204, and an air return end of the compressor 201, respectively. Ports h, i, and f of the second four-way valve 204 are connected to the outdoor heat exchanger 202, the air return end of the compressor 201, and one end of the refrigerant flow path of the heat exchange water tank 301, respectively. The other end of the refrigerant flow of the heat exchange water tank 301 is connected in a bypass manner between a first solenoid valve 120 and the outdoor heat exchanger 202220 via a first check valve 302250. The outdoor unit 200 is connected to the outdoor heat exchanger 202220. The outdoor heat exchanger 202 comprises three heat exchange coils arranged in parallel in the wind direction of the wind blades thereof, wherein the three heat exchange coils are connected together at one end to connect to port h of the second four-way valve 204240, and the other end of the three heat exchange coils are connected to a first outdoor expansion valve EXV1, a second outdoor expansion valve EXV2, and a third outdoor expansion valve EXV3 respectively, and then joint together to connect to the outdoor unit 200. The system further comprises an indoor unit temperature unit 102 arranged in the indoor unit 100 for detecting and obtaining the outlet temperature value of the indoor unit 100, a water temperature unit 303 arranged at the heat exchange water tank 301 for detecting and obtaining water temperature, and a high-pressure sensor 205 and a low-pressure sensor 206 arranged at the output end and the air return end of the compressor 201, respectively.

In this embodiment, the indoor unit 100 includes at least two indoor heat exchangers 101 arranged in parallel. Each indoor heat exchanger 101 is provided with an indoor unit temperature unit 102 for monitoring the outlet temperature of each indoor heat exchanger 101.

To facilitate understanding, a further description is provided with regard to a control method of the above-mentioned air-conditioning system.

In this embodiment, the control method of the air-conditioning system includes a cooling mode, a heating mode, a heat recovery mode, and a hot water production mode. When the air-conditioning system is powered on and runs in any mode, the opening and closing conditions of each outdoor expansion valve are adjusted correspondingly based on the predetermined conditions for each mode.

In this embodiment, when the air-conditioning system is powered on and runs in the cooling mode, the opening and closing conditions of the outdoor expansion valves are adjusted correspondingly based on a cooling demand ratio $\varphi 1$ between a cooling capacity demand N1 of the indoor unit 100 in operation and an overall cooling capacity Nt1 of the indoor unit 100, and the opening degree of each open outdoor expansion valve is adjusted correspondingly based on the discharge pressure Tp of the compressor 201, wherein the larger the cooling demand ratio $\varphi 1$, the greater the number of outdoor expansion valves opened, namely, when $\varphi 1 < 30\%$, open the second outdoor expansion valve EXV2 and close the first outdoor expansion valve EXV1 and the third outdoor expansion valve EXV3; when $30\% \leq \varphi 1 \leq 60\%$, open the first outdoor expansion valve EXV1 and the second outdoor expansion valve EXV2 and close the third outdoor expansion valve EXV3; when $\varphi 1 > 60\%$, open the first outdoor expansion valve EXV1, the second outdoor expansion valve EXV2, and the third outdoor expansion valve EXV3.

The overall cooling capacity Nt1 of the indoor unit 100 is a fixed value of the air-conditioning system, which is determined by the specification of the air-conditioning system. The cooling capacity demand N1 of the indoor unit 100 in operation is determined by the user demand, which is a variable value. The larger the demand N1, the larger the cooling demand ratio $\varphi 1$. According to the value range of the cooling demand ratio $\varphi 1$, corresponding outdoor expansion valves are opened or closed to adapt to different capacity demands N1. Secondly, the opening degree of each open outdoor expansion valve is adjusted according to the discharge pressure Tp of the compressor 201 to ensure that each outdoor expansion valve can meet the predetermined operating requirements of the air conditioning system.

Further, during the operation in the cooling mode, the blade speed of the outdoor heat exchanger 202 is adjusted according to the high pressure value Ph. When the high pressure value Ph>2.5 MPa, the blade speed is increased; when $1.9 \text{ MPa} \leq$ the high pressure value $\text{Ph} \leq 2.5$ MPa, the blade speed is maintained at the rated speed; when the high pressure value Ph<1.9 MPa, the blade speed is reduced. The high pressure value Ph herein is obtained from real-time monitoring of a high pressure sensor 205 provided at the output end of the compressor 201, so as to dynamically adjust the rotation speed of the blades of the outdoor heat exchanger 202.

In this embodiment, when the air-conditioning system is powered on and runs in the heating mode, the opening and closing conditions of the outdoor expansion valves are adjusted correspondingly based on a heating demand ratio $\varphi 2$ between an actual heating capacity demand N2 of the indoor unit 100 in operation and an overall heating capacity Nt2 of the indoor unit 100, and the opening degree of each open outdoor expansion valve is adjusted according to the discharge pressure Tp of the compressor 201, wherein the greater the heating demand ratio $\varphi 2$, the greater the number of outdoor expansion valves opened, namely, when $\varphi 2 < 30\%$, open the second outdoor expansion valve EXV2 and close the first outdoor expansion valve EXV1 and the third outdoor expansion valve EXV3; when $30\% \leq \varphi 2 \leq 60\%$, open the first outdoor expansion valve EXV1 and the second outdoor expansion valve EXV2 and close the third outdoor expansion valve EXV3; when $\varphi 2 > 60\%$, open the first outdoor expansion valve EXV1, the second outdoor expansion valve EXV2 and the third outdoor expansion valve EXV3.

The overall cooling capacity Nt2 of the indoor unit 100 is a fixed value of the air-conditioning system, which is determined by the specification of the air-conditioning system. The actual cooling capacity demand N2 of the indoor unit 100 in operation is determined by the user demand, which is a variable value. The larger the capacity demand N2, the larger the cooling demand ratio $\varphi 2$. According to the value range of the cooling demand ratio $\varphi 2$, corresponding outdoor expansion valves are opened or closed to adapt to different capacity demands N2. Secondly, the opening degree of each open outdoor expansion valve is adjusted according to the discharge pressure Tp of the compressor 201 to ensure that each outdoor expansion valve can meet the predetermined operating requirements of the air conditioning system.

Further, during the operation in the heating mode, the blade speed of the outdoor heat exchanger 202 is adjusted according to the low pressure value Pl. When the low pressure value Pl>1.0 MPa, the blade speed is reduced; when $0.6 \text{ MPa} \leq$ the low pressure value $\text{Pl} \leq 1.0$ MPa, the blade speed is maintained at the rated speed; when the low pressure value Pl<0.6 MPa, the blade speed is increased. The low pressure value Pl herein is obtained from real-time monitoring of a low pressure sensor 206 provided at the air return end of the compressor 201, so as to dynamically adjust the rotation speed of the blades of the outdoor heat exchanger 202.

In this embodiment, when the air conditioning system is powered on and runs in the heat recovery mode, the opening and closing conditions of the outdoor expansion valves are adjusted accordingly based on the initial outlet temperature value T2B of the indoor unit 100 in operation. During the operation in the heat recovery mode, the real-time outlet temperature value T2B' of the indoor unit 100 is continuously monitored and the opening degree of each open outdoor expansion valve is adjusted at intervals of a rated period based on the real-time outlet temperature value T2B'. The initial outlet temperature value T2B herein is the average value of the outlet temperature values monitored by each indoor unit temperature unit 102 in operation, and the real-time outlet temperature value T2B' is the average value of the outlet temperatures monitored by each indoor unit temperature unit 102 during operation.

In this embodiment, upon power-on to operate in the heat recovery mode, if T2B<6° C., the second outdoor expansion valve EXV2 is opened and the first outdoor expansion valve EXV1 and the third outdoor expansion valve EXV3 are closed; if 6° C.≤T2B≤12° C., the number of outdoor expansion valves that are currently open is maintained unchanged; if T2B>12° C., the first outdoor expansion valve, the second outdoor expansion valve, and the third outdoor expansion valve are all opened. Thus, corresponding outdoor expansion valves are opened or closed according to the value range of the initial outlet temperature value T2B.

In this embodiment, during the operation in the heat recovery mode, if the real-time outlet temperature value T2B'>12° C., the opening degree of one of the outdoor expansion valves is reduced, wherein if the opening degree of said outdoor expansion valve is adjusted to the minimum but the real-time outlet temperature value T2B' is still greater than 12° C., the opening degree of another outdoor expansion valve is reduced and the adjustment action is repeated; if the real-time outlet temperature value T2B'<6° C., the opening degree of one of the outdoor expansion valves is increased, wherein if the opening degree of said outdoor expansion valve is adjusted to the maximum but the real-time outlet temperature value T2B' is still less than 6° C., the opening degree of another outdoor expansion valve is increased and the adjustment action is repeated; if 6° C.≤the real-time outlet temperature value T2B'≤12° C., the opening degree of each outdoor expansion valve is maintained unchanged. Through the above adjustment action of each outdoor expansion valve, the real-time outlet temperature value T2B is adjusted to between 6-12° C., so that the air-conditioning system can run smoothly and in an energy-saving manner.

Further, during the operation in the heat recovery mode, the blade speed of the outdoor heat exchanger 202 is adjusted according to the low pressure value P1. When the low pressure value P1>1.0 MPa, the blade speed is reduced; when 0.6 MPa≤the low pressure value P1≤1.0 MPa, the blade speed is maintained at the rated speed; when the low pressure value P1<0.6 MPa, the blade speed is increased. The low pressure value P1 herein is obtained from real-time monitoring of the low pressure sensor 206 provided at the air return end of the compressor 201, so as to dynamically adjust the rotation speed of the blades of the outdoor heat exchanger 202.

In this embodiment, when the air conditioning system is powered on and runs in the hot water production mode, based on the water temperature difference ΔT between the actual water temperature T5 and the preset water temperature Ts of the hydraulic module 300, the opening and closing conditions of the outdoor expansion valves are adjusted accordingly, and the opening degree of each open outdoor expansion valve is adjusted correspondingly based on the discharge pressure Tp of the compressor. The preset water temperature Ts herein is a temperature set by a user as required, and the actual water temperature T5 is monitored and obtained by the water temperature unit 303 disposed at the heat exchange water tank 301. The water temperature difference ΔT equals to the preset water temperature Ts minus the actual water temperature T5, namely: when the water temperature difference ΔT>20° C., open the first outdoor expansion valve EXV1, the second outdoor expansion valve EXV2 and the third outdoor expansion valve EXV3; when the water temperature difference ΔT<5° C., open the first outdoor expansion valve EXV1 and close the second outdoor expansion valve EXV2 and the third outdoor expansion valve EXV3; when 5° C.≤the water temperature difference ΔT≤20° C., open the first outdoor expansion valve EXV1 and the second outdoor expansion valve EXV2, and close the third outdoor expansion valve EXV3.

Therefore, the opening degree of each outdoor expansion valve is adjusted according to the real-time water temperature difference ΔT, and the opening degree of each open outdoor expansion valve is adjusted according to the discharge pressure Tp of the compressor 201 to ensure that each outdoor expansion valve can adapt to the predetermined operating requirements of the air-conditioning system.

In this embodiment, during the operation in the hot water production mode, the blade speed of the outdoor heat exchanger 202 is adjusted according to the low pressure value P1. When the low pressure value P1>1.0 MPa, the blade speed is reduced; when 0.6 MPa≤the low pressure value P1≤1.0 MPa, the blade speed is maintained at the rated speed; when the low pressure value P1<0.6 MPa, the blade speed is increased.

Through the above embodiments, various operating states and adjustment actions of the air-conditioning system in different operating modes are described respectively, so as to adapt to different situations, so that the air-conditioning system can match the heat exchange conditions of the outdoor heat exchanger 202 according to different loads, thereby ensuring that the air-conditioning system operates optimally and achieves the effect of energy saving and stable operation.

The above-mentioned embodiments are only preferred embodiments of the present invention, and are not intended to limit the present invention in any form. Any variations or modifications to the technical solution of the present invention made by those familiar with the art using the technical contents disclosed above without departing from the scope of the technical solution of the present invention, are regarded as equivalent embodiments of the present invention. Therefore, all equivalent changes made according to the technical concept of the present invention without departing from the content of the technical solution of the present invention shall be covered by the protection scope of the present invention.

What is claimed is:

1. A control method of a multi-connected heat recovery air conditioning system comprising:
   comprising an indoor unit, an outdoor unit, and a hydraulic module, wherein the outdoor unit includes a compressor, an outdoor heat exchanger, a first four-way valve and a second four-way valve; the hydraulic module including a heat exchange water tank, ports d, e, c and s of the first four-way valve being connected to an output end of the compressor, one end of the indoor unit, port g of the second four-way valve, and a return end of the compressor, respectively; ports h, I, and f of the second four-way valve being connected to the outdoor heat exchanger, the return end of the compressor, and one end of a refrigerant flow path of the heat exchange water tank, respectively, the other end of the refrigerant flow path of the heat exchange water tank being connected in a bypass manner between a first solenoid valve and the outdoor heat exchanger via a first check valve, the other end of the outdoor unit being connected to the outdoor heat exchanger; the outdoor heat exchanger comprising three heat exchange coils arranged in parallel in a wind direction of fan blades thereof, wherein the three heat exchange coils are connected together at one end to connect to port h of the second four-way valve, and the other end of the three heat exchange coils are connected to preset first outdoor expansion valve, second outdoor expansion valve and third outdoor expansion valve, respectively, and then joint together to connect to the outdoor unit;

further comprising an indoor unit temperature unit arranged in the indoor unit for detecting and obtaining an outlet temperature value of the indoor unit, a water temperature unit arranged at the heat exchange water tank for detecting and obtaining water temperature, and a high-pressure sensor and a low-pressure sensor arranged respectively at the output end and the return end of the compressor;

wherein the air conditioning system includes a cooling mode, a heating mode, a hot water heat recovery mode, and a hot water production mode, wherein when the air conditioning system is powered on and runs in any mode, opening and closing conditions of each of the first, second and third outdoor expansion valves are adjusted accordingly based on predetermined conditions for each mode;

in response to the air conditioning system is powered on and runs in the cooling mode, the opening and closing conditions of the first, second and third outdoor expansion valves are adjusted correspondingly based on a cooling demand ratio $\varphi 1$ between a cooling capacity demand N1 of the indoor unit in operation and an overall cooling capacity Nt1 of the indoor unit, and the opening degree of each of the first, second and third outdoor expansion valves is adjusted based on the discharge pressure Tp of the compressor, wherein the larger the cooling demand ratio $\varphi 1$, the greater a number of the first, second and third outdoor expansion valves is opened;

in response to the air-conditioning system is powered on and runs in the heating mode, the opening and closing conditions of the first, second and third outdoor expansion valves are adjusted correspondingly based on a heating demand ratio $\varphi 2$ between an actual heating capacity demand N2 of the indoor unit in operation and an overall heating capacity Nt2 of the indoor unit, and the opening degree of each of the first, second and third outdoor expansion valves is adjusted based on the discharge pressure Tp of the compressor, wherein the larger the heating demand ratio $\varphi 2$, the greater a number of the first, second and third outdoor expansion valves is opened;

in response to the air-conditioning system is powered on and runs in the heat recovery mode, the opening and closing conditions of the first, second and third outdoor expansion valves are adjusted accordingly based on an initial outlet temperature value T2B of the indoor unit in operation, wherein during the operation in the heat recovery mode, a real-time outlet temperature value T2B' of the indoor unit is continuously monitored and the opening degree of each of the first, second and third outdoor expansion valves e is adjusted at intervals of a rated period based on the real-time outlet temperature value T2B'; and in response to the air conditioning system is powered on and runs in the hot water production mode, the opening and closing conditions of the first, second and third outdoor expansion valves are adjusted accordingly based on a water temperature difference $\Delta T$ between an actual water temperature T5 and a preset water temperature Ts of the hydraulic module, and the opening degree of each of the first, second and third outdoor expansion valves is adjusted correspondingly based on the discharge pressure Tp of the compressor.

2. The control method of the multi-connected heat recovery air conditioning system according to claim 1, characterized in that in the cooling mode, in response to $\varphi 1 < 30\%$, the second outdoor expansion valve is opened and the first outdoor expansion valve and the third outdoor expansion valve are closed; in response to $30\% \leq \varphi 2 \leq 60\%$, the first outdoor expansion valve and the second outdoor expansion valve are opened and the third outdoor expansion valve is closed; in response to $\varphi 1 > 60\%$, the first outdoor expansion valve, the second outdoor expansion valve and the third outdoor expansion valve are all opened.

3. The control method of the multi-connected heat recovery air conditioning system according to claim 1, characterized in that in the heating mode, in response to $\varphi 2 < 30\%$, the second outdoor expansion valve is opened and the first outdoor expansion valve and the third outdoor expansion valve are closed; in response to $30\% \leq \varphi 2 \leq 60\%$, the first outdoor expansion valve and the second outdoor expansion valve are opened and the third outdoor expansion valve is closed; and in response to $\varphi 2 > 60\%$, the first outdoor expansion valve, the second outdoor expansion valve and the third outdoor expansion valve are all opened.

4. The control method of the multi-connected heat recovery air conditioning system according to claim 1, characterized in that in response to the real-time outlet temperature value T2B'>12° C., the opening degree of one of the outdoor expansion valves is reduced, wherein in response to the opening degree of said outdoor expansion valve is adjusted to the minimum but the real-time outlet temperature value T2B' is still greater than 12° C., the opening degree of another outdoor expansion valve is reduced and the adjustment action is repeated; in response to the real-time outlet temperature value T2B'<6° C., the opening degree of one of the outdoor expansion valves is increased, wherein in response to the opening degree of said outdoor expansion valve is adjusted to the maximum but the real-time outlet temperature value T2B' is still less than 6° C., the opening degree of another outdoor expansion valve is increased and the adjustment action is repeated; in response to 6° C.≤the real-time outlet temperature value T2B'≤12° C., the opening degree of each outdoor expansion valve is maintained unchanged.

5. The control method of the multi-connected heat recovery air conditioning system according to claim 1, characterized in that upon power-on to operate in the heat recovery mode, in response to T2B<6° C., the second outdoor expansion valve is opened and the first outdoor expansion valve and the third outdoor expansion valve are closed; in response to 6° C.≤T2B≤12° C., the number of outdoor expansion valves that are currently open is maintained unchanged; in response to T2B>12° C., the first outdoor expansion valve, the second outdoor expansion valve, and the third outdoor expansion valve are all opened.

6. The control method of the multi-connected heat recovery air conditioning system according to claim 1, characterized in that in the hot water production mode, in response to the water temperature difference $\Delta T>20°$ C., the first outdoor expansion valve, the second outdoor expansion valve, and the third outdoor expansion valve are all opened; in response to the water temperature difference $\Delta T<5°$ C., the first outdoor expansion valve is opened and the second outdoor expansion valve and the third outdoor expansion valve are closed; in response to $5°$ C.$\leq$the water temperature difference $\Delta T \leq 20°$ C., the first outdoor expansion valve and the second outdoor expansion valve are opened and the third outdoor expansion valve is closed.

7. The control method of the multi-connected heat recovery air conditioning system according to claim 1, characterized in that during the operation in the cooling mode, the blade speed of the outdoor heat exchanger is adjusted according to the high pressure value Ph, wherein in response to the high pressure value Ph>2.5 MPa, the blade speed is increased; in response to 1.9 MPa$\leq$the high pressure value Ph$\leq$2.5 MPa, the blade speed is maintained at the rated speed; in response to the high pressure value Ph<1.9 MPa, the blade speed is reduced.

8. The control method of the multi-connected heat recovery air conditioning system according to claim 1, characterized in that during the operation in the heating mode, heat recovery mode, or hot water production mode, the blade speed of the outdoor heat exchanger is adjusted according to the low pressure value P1, wherein in response to the low pressure value P1>1.0 MPa, the blade speed is reduced; in response to 0.6 MPa$\leq$the low pressure value P1$\leq$1.0 MPa, the blade speed is maintained at the rated speed; in response to the low pressure value P1<0.6 MPa, the blade speed is increased.

* * * * *